Nov. 12, 1968    R. O. WINTHER    3,410,325
ELECTRICALLY OPERATED PORTABLE SAW GUARD LIFTER
Filed Oct. 6, 1966    3 Sheets-Sheet 3

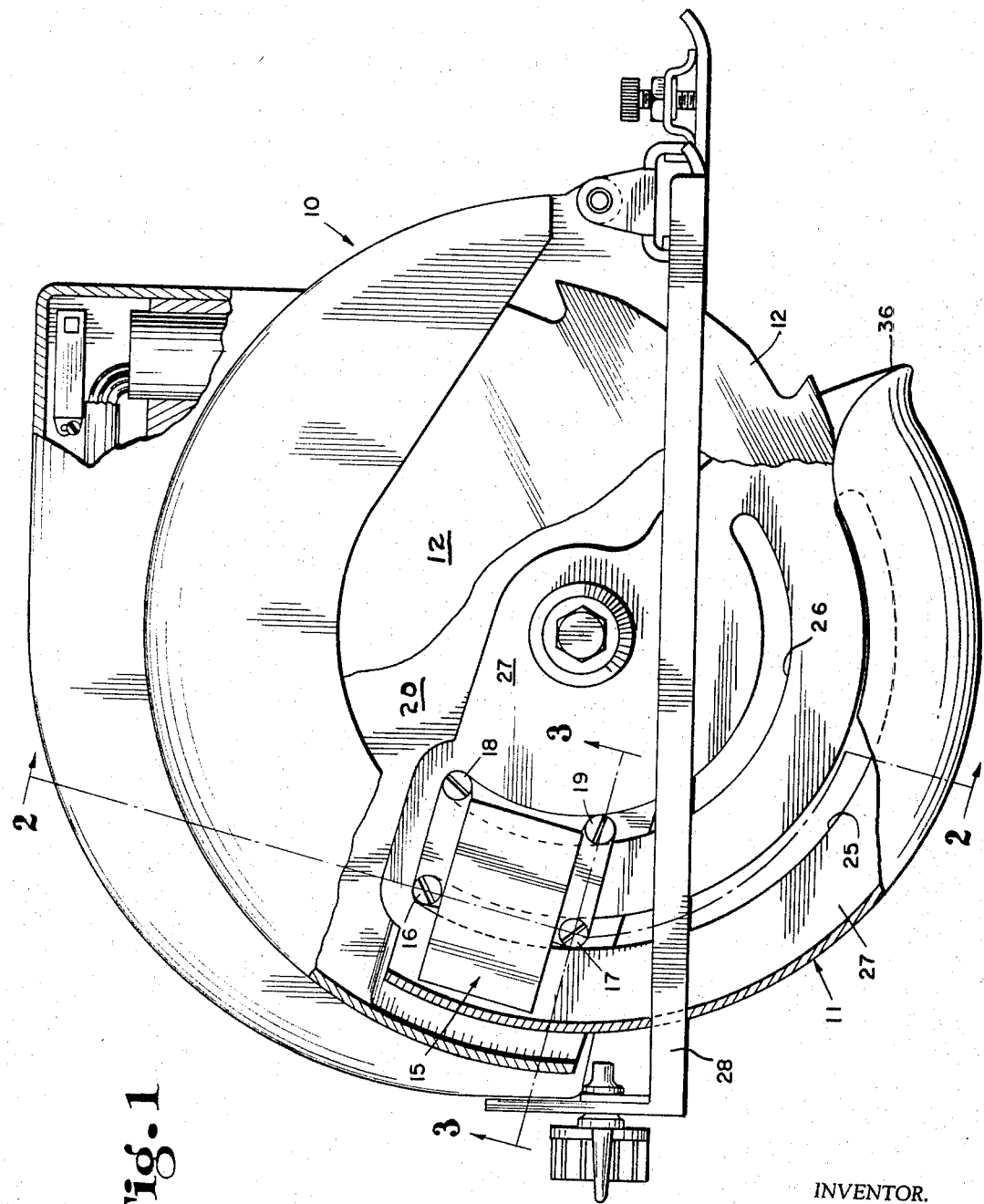

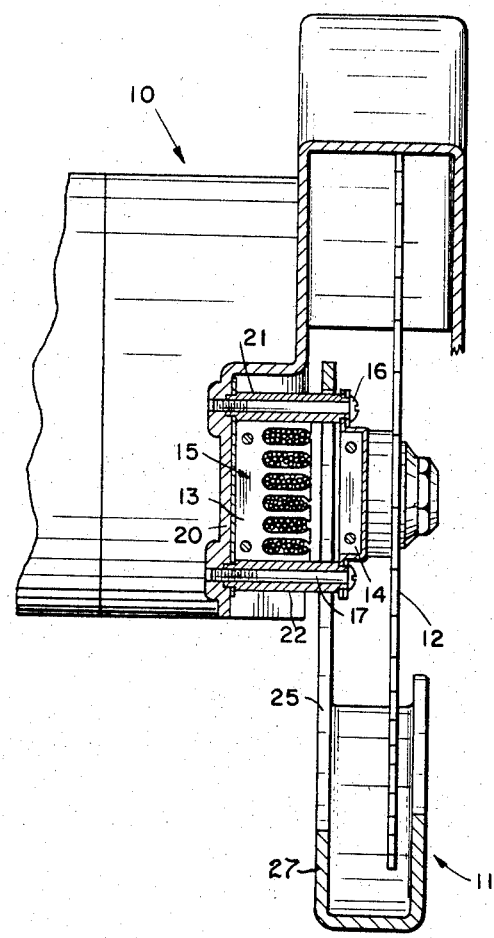
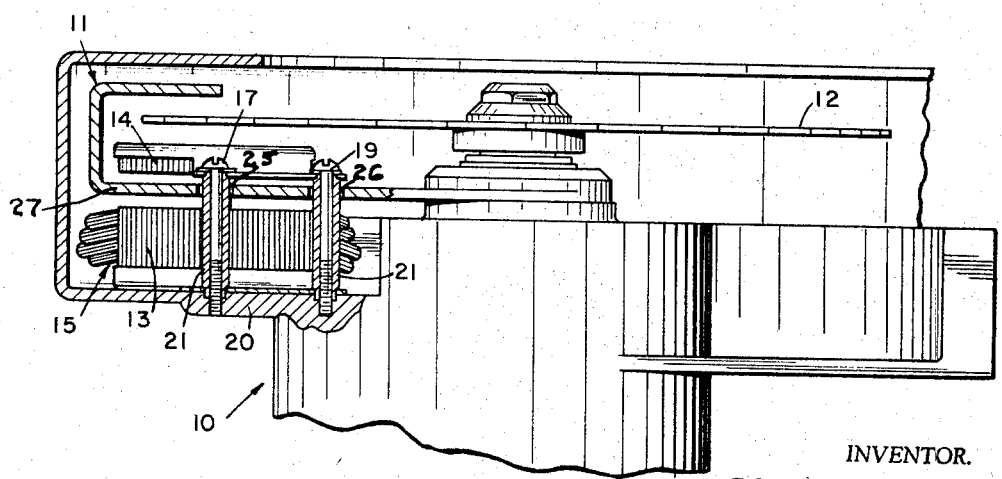

INVENTOR.
ROBERT O. WINTHER
BY
*Herbert A. Winthern*

ATTORNEY

United States Patent Office 3,410,325
Patented Nov. 12, 1968

3,410,325
ELECTRICALLY OPERATED PORTABLE SAW GUARD LIFTER
Robert O. Winther, Menominee, Mich., assignor to Vernco Corporation of Tennessee, Newport, Tenn., a corporation
Filed Oct. 6, 1966, Ser. No. 584,790
3 Claims. (Cl. 143—159)

This invention relates to electrical means for temporarily lifting a rockable guard normally urged to drop downwardly under a peripheral portion of a circular saw blade as mounted on a portable unit. At times an operator of a portable saw unit will encounter a situation when the said guard does not retract and it is difficult or impossible to advance the saw to start a cut. For example, in approaching a board in a direction for making a diagonal cut by the saw, the guard will strike the board edge at such an angle that pressure thereagainst will be exerted without pushing the guard back from around the under side of the saw blade. In that situation, the operator is tempted to grasp the guard by hand to pull it out of the way, a most dangerous procedure.

It is the primary purpose of this invention to provide means which will retract the guard at will simply by pushing and holding a button.

Briefly, the invention comprises a linear motor mounted on the saw frame to be stationary relative to travel of the saw and to have the aluminum side wall of the guard pass through a two phase magnetic field of the motor to induce eddy currents in the wall and in turn, a retracting travel of the guard.

A further important object of the invention is to provide such means in very compact form in light weight with no moving parts other than the guard itself.

One particular form of the invention is described in detail with reference being had to the accompanying drawings, in which:

FIG. 1 is a view in side elevation of a typical portable saw with parts broken away to illustrate the added parts involved in the invention;

FIG. 2 is a view in section on the line 2—2 in FIG. 1;

FIG. 3 is a view in section on the line 3—3 in FIG. 1;

Figure 4:
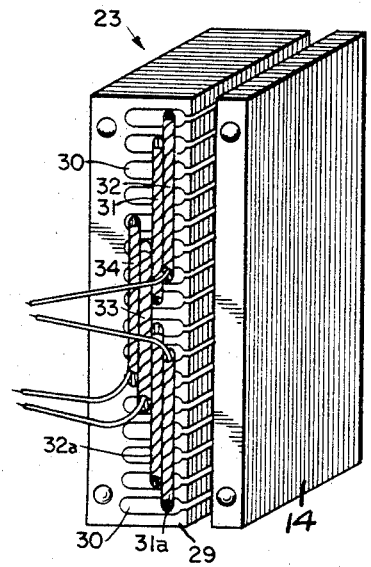
FIG. 4 is a view in perspective of the motor alone, detached from the saw unit.

The invention is applied to a portable saw unit generally designated by the numeral 10 and is of a well known commercially obtainable type. While details thereof may vary, the overall design remains approximately the same throughout various makes of saws. The saw unit 10 carries a safety guard to rockably surround the under side of the saw blade and is spring urged to remain in the safety position. It is this guard generally designated by the numeral 11 which is to be retracted by the inventive structure. The guard 11 is rockably mounted on the saw unit 10 to rock on the axis of rotation of the saw blade 12 in the usual and well known manner. A torsion spring (not shown) is employed to retain the guard 11 yieldingly in the saw shielded position, this position being indicated in FIGS. 1–3.

A wound, flat stator 13 and a flat keeper 14 of a linear motor generally designated by the numeral 15 are mounted on screws 16, 17, 18 and 19 which are secured to a fixed wall 20 of the saw unit, FIGS. 1–3. Each of those screws carries a surrounding sleeve 21 which serve to space the keeper 14 from the stator 13 to permit the guard wall 27 to pass freely therebetween.

Two spaced apart, concentric arcuate slots 25 and 26 are provided through the wall 27 of the guard 11. The screws 16 and 17 with their sleeves 21 pass freely through the slot 25. The screws 18 and 19 with their sleeves 21 pass freely through the slot 26.

The guard wall is made of a conductive but, nonmagnetic material such as aluminum. The slots 25 and 26 have arcuate lengths to permit the guard 11 to be rocked from its solid line position, FIG. 1, which is the normal saw blade guarding position, to a fully retracted position. The retracted position is normally that position wherein the guard nose 36 is riding on the member (not shown) being sawed.

Figure 5:
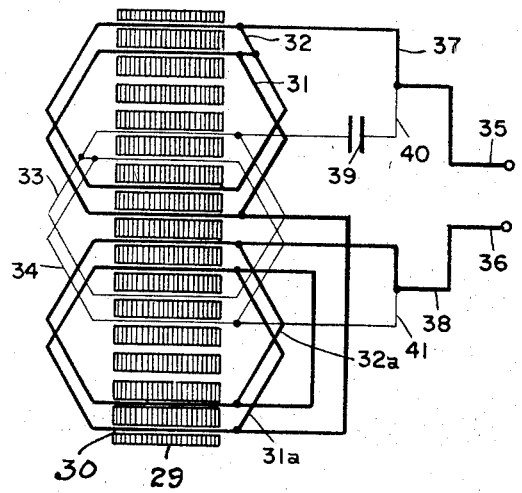
FIG. 5 is a schematic diagram of the winding of the motor stator.
Figure 6:
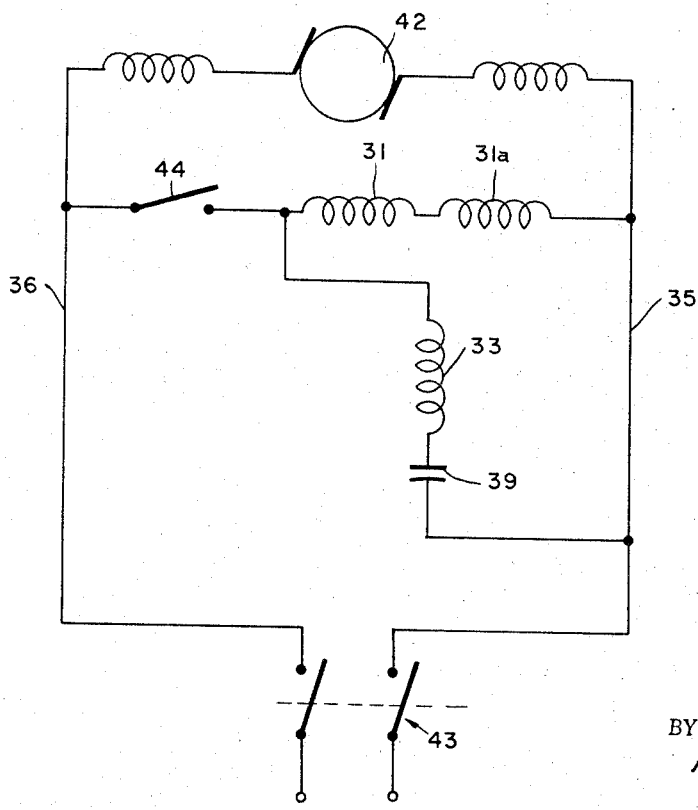
FIG. 6 is an overall wiring diagram.

The stator 23, FIGS. 4, 5 has a laminated core 29 with a plurality of slots 30 extending laterally thereacross. Two coils of main windings 31, 32 and 31a and 32a are respectively carried in slots 30 on each side of a central zone. Two coils of auxiliary windings 33 and 34 are carried in slots 30 across said central zone. The main windings 31, 32 and 31a, 32a are connected to the electrical supply line wires 35 and 36 through the wires 37 and 38. The auxiliary windings 33 and 34 are connected across these line wires 37 and 38 through a capacitor 39 and the wires 40 and 41.

Referring to FIG. 5, the wiring diagram includes the saw blade drive motor 42 which is connected across the line wires 35 and 36, and controlled by the switch 43. The linear motor 15 is in parallel with the saw blade motor 42. This linear motor 15 has a push button, normally spring opened type of switch 44 in its circuit between the main and auxiliary windings and the line wire 36. Therefore, the main and auxiliary windings are in closed circuit only so long as the switch 44 is manually held closed.

The motor 15 comprises the two main windings, the auxiliary winding, the capacitor, the keeper 14, and the nonmagnetizable aluminum guard wall 27. By the use of the auxiliary winding and the capacitor, the guard wall 27 will rotate through a two-phase magnetic field set up across the air gap between the stator and the keeper. Flux of eddy currents induced in the wall 27 provide a portion of the developed torque sufficient to rock the guard 11 from under the saw blade 12 to permit the saw to enter the member to be cut.

While I have herein shown and described my invention in the one specific form, it is obvious that structural and electrical changes may be employed without departing from the spirit of the invention; and I therefore, do not desire to be limited to that precise form beyond the limitations which may be imposed by the following claims.

I claim:

1. The combination with a portable rotary saw unit having
   a unit frame;
   a rotating saw blade carried by the frame; and
   a guard having a planar wall section with a cupped portion about a circumferential length of the periphery of the saw blade, the guard being rotatably carried by said frame and normally covering the underside of said periphery; of
   a stator carried and held stationary by said frame along a side of said wall;
   a keeper carried and held stationary by said frame along the other side of said wall opposite said stator;
   said wall being rotatable between the stator and the keeper;
   said wall being of a conductive and nonmagnetizable material; and
   electrical means associated with said stator and said keeper setting up a two-phase magnetic flux therebetween producing a torque in conjunction with said wall for rotating the guard.

2. The structure of claim 1, in which
said wall has at least one arcuate slot therethrough, the curvature of which is centered on the axis of rotation of said blade; and
means extending through said slot from said stator and engaging said keeper comprising the keeper carrying and holding means in reference to said frame.

3. The structure of claim 1, in which said wall has two, radially spaced apart, concentric arcuate slots therethrough, the curvature of the slots being centered on the axis of rotation of said blade;
said stator having a flat side presented toward said wall;
means fixing said stator to said frame;
posts carried by said frame and extending through said slots;
said keeper having a flat face presented toward said wall and mounted on end portions of said posts extending through said slots; and
two groups of main windings one on each side of a central zone in said stator; and
an auxiliary winding in said stator across said central zone and in series with a capacitor setting up out of phase magnetic fields through said wall and said keeper upon energization of the windings.

References Cited

UNITED STATES PATENTS

| | | | |
|---|---|---|---|
| 2,722,246 | 11/1955 | Arnoldy | 143—159 |
| 3,063,481 | 11/1962 | Sutherland | 143—159 |

FOREIGN PATENTS

| | | |
|---|---|---|
| 1,056,355 | 4/1959 | Germany. |

WILLIAM S. LAWSON, *Primary Examiner.*